United States Patent
Ichikawa et al.

[11] Patent Number: 5,430,373
[45] Date of Patent: Jul. 4, 1995

[54] ABSOLUTE ENCODER

[75] Inventors: Misao Ichikawa, Gunma; Kazuo Ohnishi, Saitama; Tokio Sekiguchi, Gunma, all of Japan

[73] Assignee: Japan Servo Co., Ltd., Tokyo, Japan

[21] Appl. No.: 9,267

[22] Filed: Jan. 22, 1993

[30] Foreign Application Priority Data

Feb. 13, 1992 [JP] Japan ................................. 4-058746
Feb. 13, 1992 [JP] Japan ................................. 4-058747
Feb. 13, 1992 [JP] Japan ................................. 4-058817

[51] Int. Cl.$^6$ ............................................. G01B 7/30
[52] U.S. Cl. .......................... 324/207.21; 324/207.25; 341/15
[58] Field of Search ................ 324/207.21, 207.25, 324/235, 252, 251; 338/32 R; 307/309; 360/113; 341/15

[56] References Cited

U.S. PATENT DOCUMENTS

| | | | |
|---|---|---|---|
| 4,551,676 | 11/1985 | Amemiya et al. | 324/207.21 |
| 4,589,038 | 5/1986 | Radtke | 324/207.21 X |
| 4,599,561 | 7/1986 | Takahashi et al. | 324/207.21 |
| 4,766,376 | 8/1988 | Takahashi et al. | 324/207.21 |
| 4,785,241 | 11/1988 | Abiko et al. | 324/207.21 |
| 4,786,870 | 11/1988 | Kawamata et al. | 324/207.21 |
| 4,904,937 | 2/1990 | Takahashi et al. | 324/207.21 |
| 5,172,057 | 12/1992 | Yoshimura et al. | 324/207.21 |
| 5,243,280 | 9/1993 | Kusumi | 324/207.21 |
| 5,289,122 | 2/1994 | Shigeno | 324/207.21 X |

FOREIGN PATENT DOCUMENTS

| | | |
|---|---|---|
| 0230287 | 1/1987 | European Pat. Off. . |
| 0332244 | 2/1989 | European Pat. Off. . |
| 118259 | 9/1979 | Japan . |
| 83619 | 4/1987 | Japan . |
| 62-083619 | 9/1987 | Japan . |
| 24513 | 1/1990 | Japan . |

OTHER PUBLICATIONS

"Absolute-Type Position Transducers Using a Pseudorandom Encoding"; IEEE Transactions on Instrumentation and Measurement, vol. IM-36, No. 4, Dec. 1987.

Primary Examiner—Sandra L. O'Shea
Assistant Examiner—Warren S. Edmonds
Attorney, Agent, or Firm—Nilles & Nilles

[57] ABSTRACT

An absolute encoder wherein tracks are arranged side-by-side on a magnetic drum in the axial direction thereof, and absolute patterns of circulatory random sequence codes are divided and recorded on the tracks, respectively. An additional track for generating sinewaves of two phases in synchronism with the reading of the absolute patterns is provided on the magnetic drum, so that an output can be obained by combining a coarse value of an absolute position obtained from the tracks and a fine value of an absolute position obtained from the additional track. The absolute patterns are detected from the two tracks recorded on the magnetic drum by magnetic resistive elements connected with each other to form circuits each having a three-terminal. Terminals of the magnetic resistive elements are connected through a common line with an electric power source in order to prevent the lines from being crossed.

5 Claims, 17 Drawing Sheets

F I G. 1
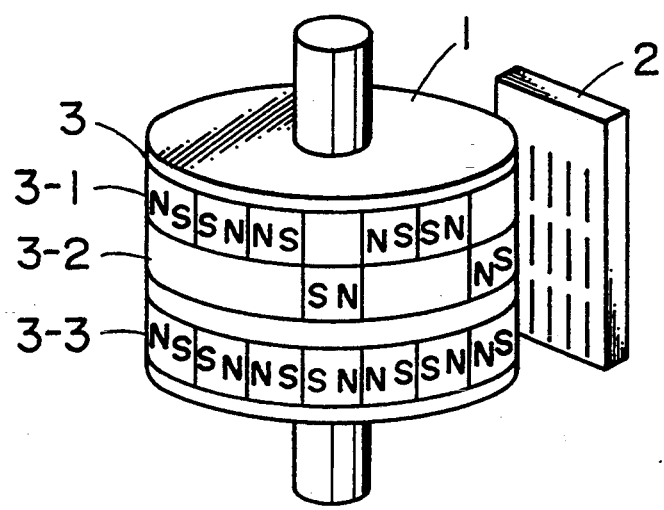
F I G. 2
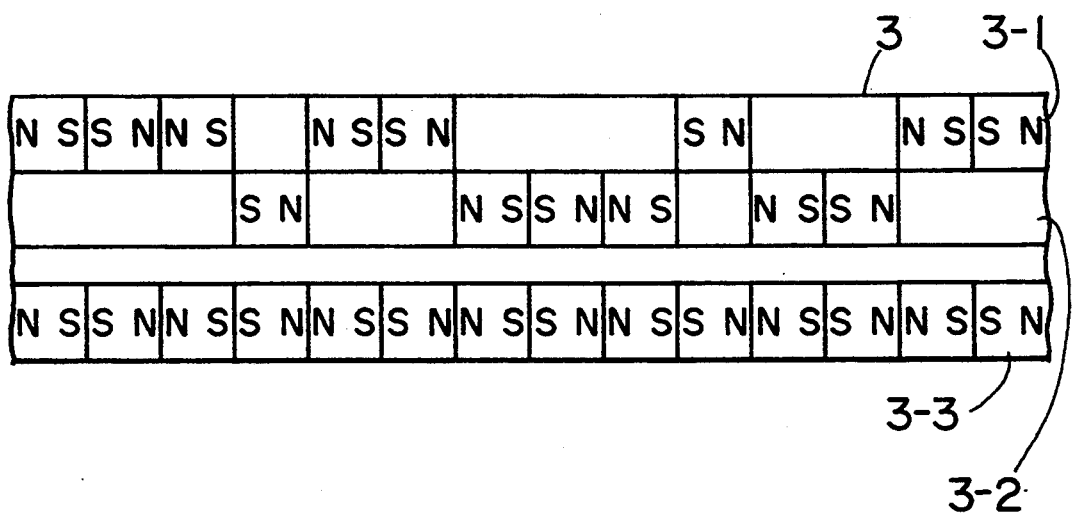

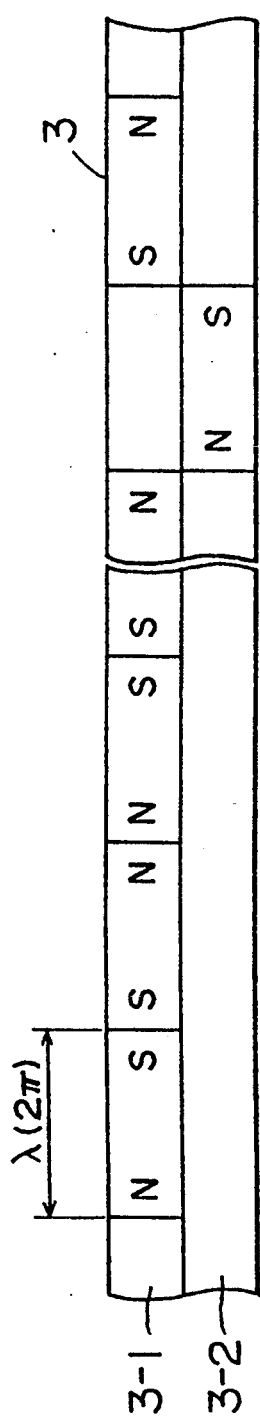
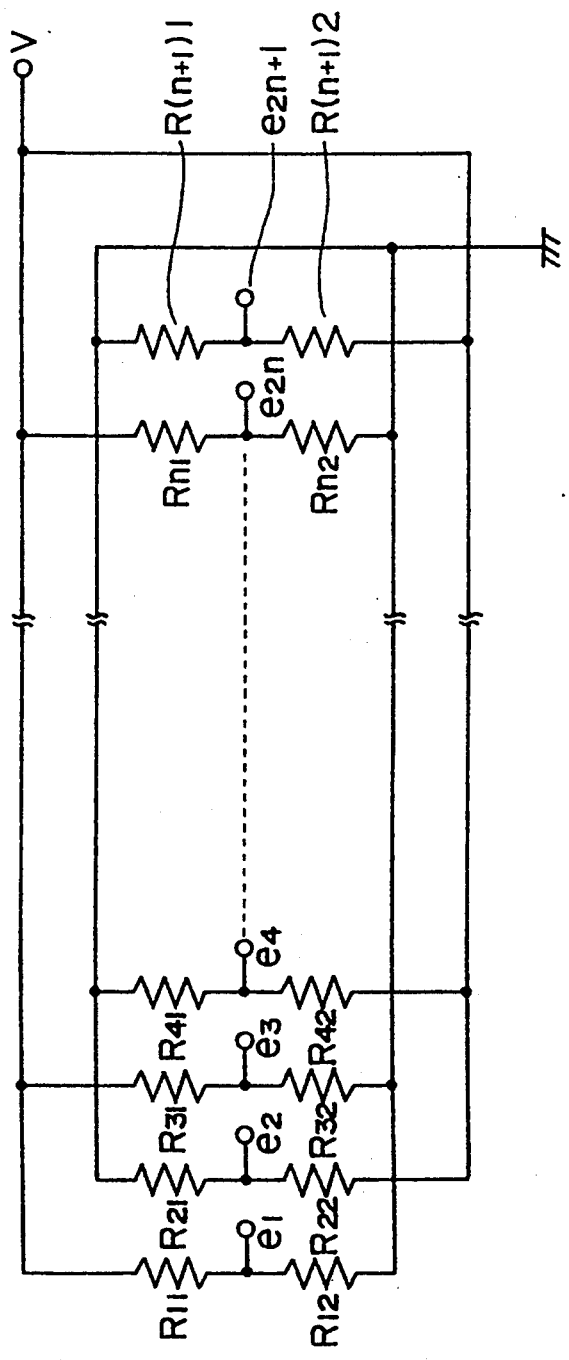
FIG. 12

F I G. 13
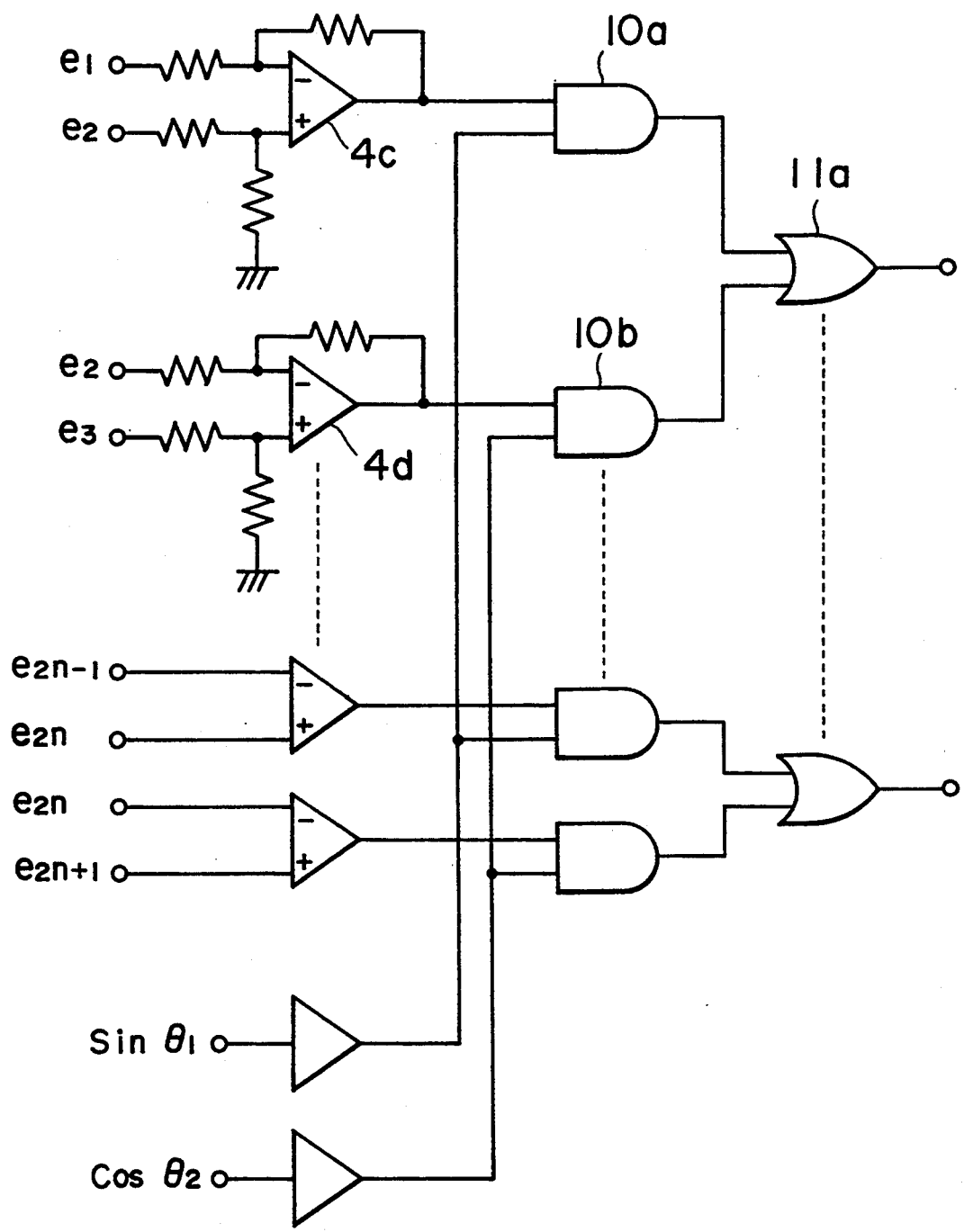

F I G . 18
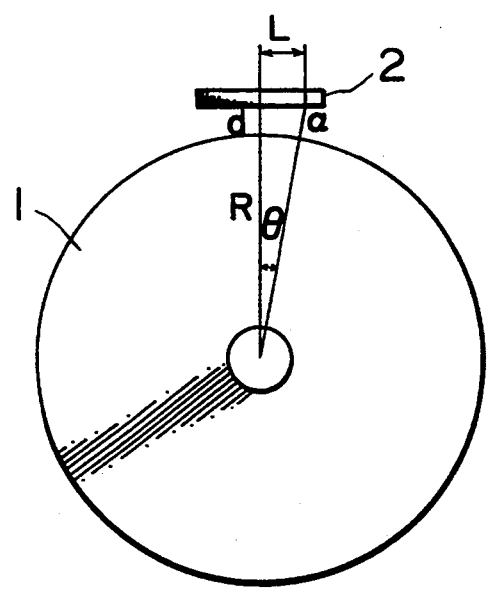

ABSOLUTE ENCODER

BACKGROUND OF THE INVENTION

1. Field of the Invention

The present invention relates to an encoder, and more particularly relates to an absolute encoder wherein an output of a rotary member is coded, so that an absolute position of the rotary member can be detected directly.

2. Description of the Prior Art:

A magnetic type absolute encoder is formed by combining a detector utilizing magneto-resistive elements (which will hereinafter be referred as MR elements) with a magnetic drum on which magnetic patterns of more than two rows are recorded magnetically as described in Japanese Patents Laid-Open Nos. 54-118259 and 62-83619.

In general, magnetic patterns of n tracks are necessary in order to obtain a resolution of $2^n$ in such absolute encoder. Accordingly, as shown in FIGS. 23 and 24, a plurality of tracks 30 (six in this case) are disposed on an outer peripheral surface of a magnetic drum 10, informations of three bits are recorded on said tracks 30, and a magnetic sensor 20 having MR elements ($R_{01}$, $R_{02}$ - - - ) of a number corresponding to said three bits facing the magnetic drum 10, so that an absolute value can be outputted by combining signals from the plural MR elements.

Japanese Patent Laid-Open No. 2-24518 discloses an absolute encoder wherein absolute signals can be obtained from tracks having absolute patterns.

However, it is necessary to arrange parallely a plurality of tracks on the magnetic drum 10 in the axial direction thereof, as shown in FIG. 23, in order to increase the resolution of the absolute encoder of the prior art, such as an absolute encoder shown in Japanese Patent Laid-Open No. 62-88619, thereby causing the absolute encoder large in size.

Further, it is necessary to describe informations of $2^n$ on one track in order to obtain a resolution of $2^n$, for example, in an absolute encoder using circulatory random sequence codes, so that the absolute encoder must be made precisely in dimension and becomes expensive.

In the conventional absolute position detecting method described above, a plurality of absolute patterns are recorded on the peripheral surface of the magnetic drum in the circumferential direction thereof and MR elements corresponding thereto are arranged. In such case, it is better to increase the resolution by shortening the recording pitch in consideration of the size. However, the shortening of the recording pitch has a limitation in consideration of the arrangement of the MR elements, and if the recording pitch is increased, the magnetic drum becomes large in size.

Further, as shown in FIG. 24, leakage magnetic fluxes of N, S shown by arrows on the magnetic drum are sensed by the MR elements to generate signals in the absolute encoder. Accordingly, if the recording pitch is increased, the width of the magnetic sensor 20 becomes large as shown in FIG. 25. Accordingly, as shown in FIG. 25, a distance $\alpha$ between an MR element at an end portion of the magnetic sensor 20 and the center of the magnetic drum 10 becomes larger than a distance d between an MR element at the center portion of the sensor 20 and the center of the magnetic drum 10. Experiments show that a good sensing property cannot be obtained, because the MR element at the end portion of the magnetic sensor 20 cannot sense enough, when the relation of the $\alpha$ and d is expressed by $\alpha > d + 0.1d.$

SUMMARY OF THE INVENTION

It is an object of the present invention to solve the above-mentioned problems and to provide a compact and inexpensive absolute encoder having a high resolution.

The above-mentioned object is achieved by an absolute encoder comprising a magnetic drum having first, second, and third tracks; and a pattern detector for reading patterns on the first, second and third tracks; wherein absolute patterns of circulatory random sequence codes are divided and recorded on the first and second tracks which are arranged side-by-side on the magnetic drum in the axial direction thereof, wherein the third track is provided for generating sinewaves of two phases in synchronism with the reading of the absolute patterns on the first and second tracks, and wherein an output is obtained by combining a first value of an absolute position detected by the pattern detector from the first and second tracks with a second value of an absolute position obtained by operating information of the sinewaves from the third track.

The absolute encoder of the present invention further comprises a first signal and a second signal; wherein the first and second signal are deviated in phase from each other by one half of pole pitch of magnetic recording and are obtained from the first and second tracks by the pattern detector; wherein one of the first and second signals is selected according to the second value of the absolute position obtained by operating the sinewave information; and wherein the output is obtained by interpolating the second value of the absolute position obtained by operating the sinewave information to the: selected signal.

The above-mentioned object can also be achieved by an absolute encoder comprising a magnetic drum having first, second and third tracks; and a pattern detector for reading patterns on the first, second and third tracks; wherein absolute patterns of circulatory random sequence codes are divided and recorded on the first and second tracks which are arranged side-by-side on respective first and second track sides of the magnetic drum in the axial direction thereof, wherein the third track is provided for generating sinewaves of two phases in synchronism with the reading of the absolute patterns on the first and second tracks, wherein the pattern detector has a plurality of sets of magneto-resistive elements which are deviated in position from each other by one half of the recording pitch of the first, second and third tracks, wherein each of the plurality of sets has two magneto-resistive elements facing the first and second tracks respectively and connected with each other to form a plurality of circuits each having two magneto-resistive elements, wherein each of said plurality of circuits has a first track side and a second track side corresponding to the first and second track sides of the magnetic drum, and wherein, in each of the circuits, a terminal at the first track side of the circuit is connected to one terminal of an electric power source, a terminal at the second track side of the circuit is connected to another terminal of the electric power source, and an output is obtained from an intermediate terminal between the two magneto-resistive elements of the circuit.

The above-mentioned object can also be achieved by an absolute encoder comprising a magnetic drum having first, second, and third tracks; and a pattern detector for reading patterns on the first, second and third tracks; wherein absolute patterns of circulatory random sequence codes are divided and recorded on the first and second tracks which are arranged side-by-side on respective first and second track sides of the magnetic drum in the axial direction thereof, wherein the third track is provided for generating sinewaves of two phases in synchronism with the reading of the absolute patterns on the first and second tracks, wherein the pattern detector has a plurality of sets of magneto-resistive elements which are deviated in position from each other by one half of the recording pitch of the first, second and third tracks, wherein each of the plurality of sets has two magneto-resistive elements facing the first and second tracks respectively and connected with each other to form a plurality of circuits each having two magneto-resistive elements, wherein each of said plurality of circuits has a first track side and a second track side corresponding to the first and second track sides of the magnetic drum, wherein terminals at the first track side of odd number circuits and terminals at the second track side of even number circuits are connected to a first terminal of an electric power source, wherein terminals at the second track side of odd number circuits and terminals at the first track side of even number circuits are connected to a second terminal of the electric power source, and wherein an output is obtained from an intermediate terminal between the two magneto-resistive elements in each of the circuits.

The above-mentioned object can also be achieved by an absolute encoder comprising a magnetic drum having first, second and third tracks; and a pattern detector for reading patterns on the first, second and third tracks; wherein absolute patterns of circulatory random sequence codes are divided and recorded on the first and second tracks which are arranged side-by-side on respective first and second track sides of the magnetic drum in the axial direction thereof, wherein the third track is provided for generating sinewaves of two phases in synchronism with the reading of the absolute patterns on the first and second tracks, wherein the pattern detector has a first to $(n+1)$th sets of magneto-resistive elements which are deviated in position from each other by one half of the recording pitch of the first, second and third tracks, where n is a whole number greater than three, wherein each of the plurality of sets has two magneto-resistive elements facing the first and second tracks respectively and connected with each other to form a plurality of circuits each having two magneto-resistive elements, wherein each of said plurality of circuits has a first track side and a second track side corresponding to the first and second track sides of the magnetic drum, wherein terminals at the first track side of each of the plurality of circuits are connected to a first terminal of an electric power source, wherein terminals at the second track side of the first and $(n+1)$th circuits are connected to a second terminal of the electric power source, wherein each terminal at the second track side of the second to nth circuits is directly connected to only one neighboring terminal at the second track side of a neighboring circuit and then connected to the second terminal of the electric power source through a common line, and wherein an output is obtained from an intermediate terminal between the two magneto-resistive elements in each of the circuits.

Other objects as well as advantageous features of the present invention will become apparent from the following descriptions of the embodiments taken in conjunction with the accompanying drawings.

BRIEF DESCRIPTION OF THE DRAWINGS

FIG. 1 is a perspective view showing an embodiment of an absolute encoder according to the present invention;

FIG. 2 is an extended view of an outer peripheral surface of a magnetic drum in the absolute encoder according to the present invention;

FIG. 12 is an extended view showing magnetic tracks and MR elements of a magnetic sensor in another embodiment of the present invention;

FIG. 13 is a third processing circuit in said embodiment of the absolute encoder according to the present invention;

FIG. 18 is a view explaining the relation between the magnetic drum and a magnetic sensor in the said embodiment according to the present invention;

DESCRIPTION OF THE PREFERRED EMBODIMENTS

Figure 3:
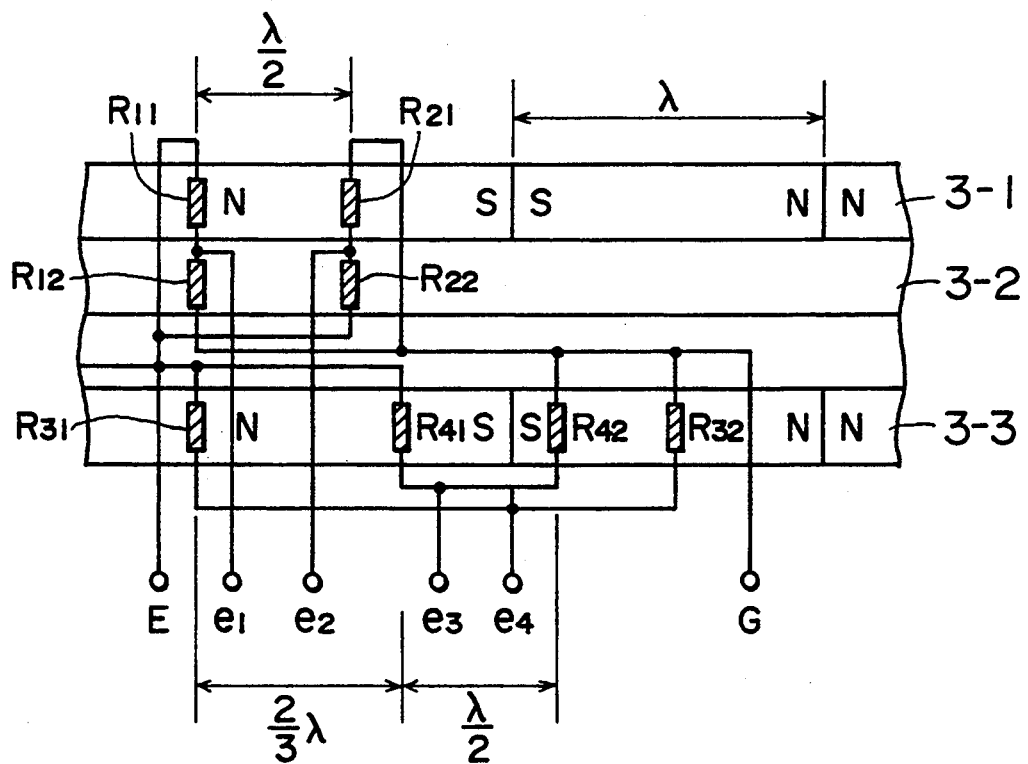
FIG. 3 is an extended view showing MR elements of a magnetic sensor in the absolute encoder according to the present invention.

An embodiment of the present invention will be explained with reference to FIGS. 1 to 11.

In FIG. 1 showing an absolute encoder according to the present invention, reference numeral 1 denotes a magnetic drum, 2 denotes a magnetic sensor having MR elements thereon, and 3 denotes a magnetic track formed on an outer peripheral surface of the magnetic drum 1 in a circumferential direction thereof.

The magnetic track 3 in the present invention, as shown in FIG. 1, comprises three magnetic tracks 3-1, 3-2 and 3-3 arrange side-by-side on the magnetic drum 1 in the axial direction thereof, respectively. Two upper side tracks 3-1 and 3-2 are used as a track for outputting absolute positions.

On the upper side magnetic tracks 3-1 and 3-2, absolute patterns using circulation random sequence codes are recorded, whereas on the lower side magnetic track 3-3, magnetic poles N and S are recorded one after the other regularly, so that sinewaves can be obtained from the magnetic track 3-3.

As shown in FIG. 2, the magnetic track 3-1 has no signal recorded portions, whereas the magnetic track 3-2 has signal recorded portions corresponding in position to said no signal recorded portions on the magnetic track 3-1, and has no signal recorded portions corresponding in position to said signal recorded portions on the magnetic track 3-1.

As shown in FIG. 3, MR elements $R_{11}$ and $R_{21}$ are arranged corresponding to the magnetic track 3-1 and separated from each other by one half of a minimum recording pitch $\lambda$ on the recording track 3-1. Similarly, MR elements $R_{12}$ and $R_{22}$ are arranged corresponding to the magnetic track 3-2, and separated from each other by one half of the minimum recording pitch $\lambda$ on the recording track 3-2. The MR elements $R_{11}$ and $R_{12}$ are connected to each other to form a circuit having three terminals. Similarly, the MR elements $R_{21}$ and $R_{22}$ are connected to each other to form a circuit having a three-terminal.

Figure 4:
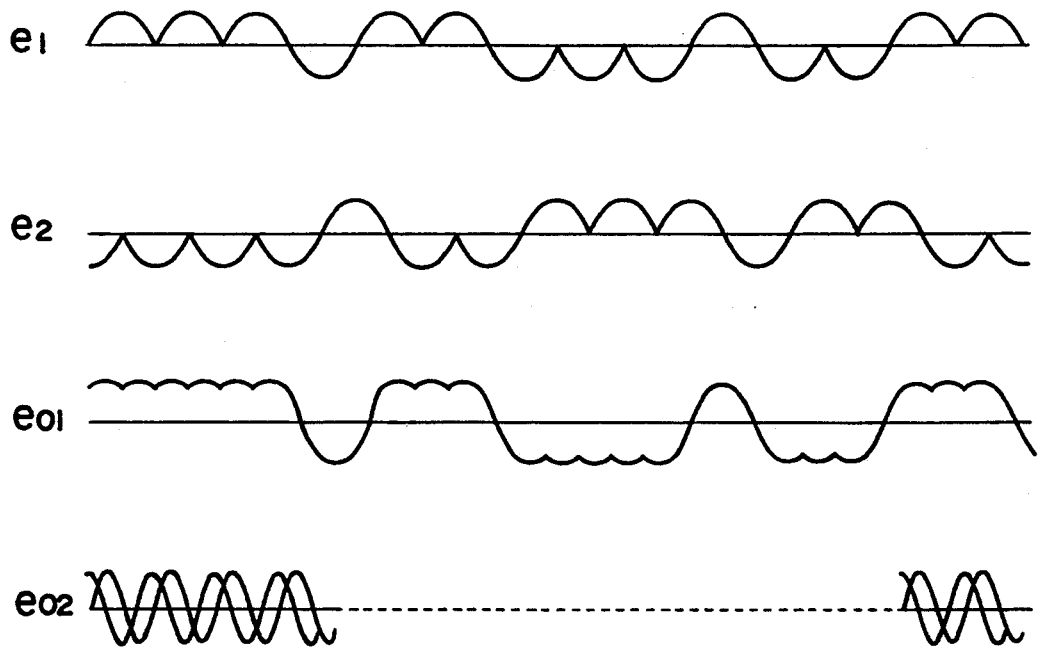
FIG. 4 is a view showing wave forms of signals from the magnetic sensor and processing circuits in the absolute encoder according to the present invention.
Figure 5:
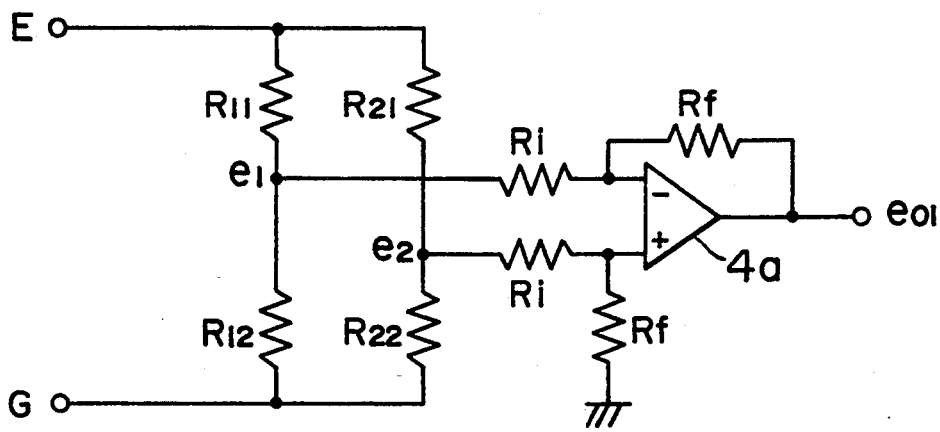
FIG. 5 shows a first processing circuit in the absolute encoder according to the present invention.

In the arrangement of the magnetic tracks and the MR elements shown in FIG. 3, when the magnetic drum 1 is rotated outputs $e_1$ and $e_2$ as shown in FIG. 4 are generated from said two circuits, respectively. An output $e_{01}$ can be obtained by operating the outputs $e_1$ and $e_2$ in a first processing circuit shown in FIG. 5. In FIG. 5, reference numeral 4a denotes an operational amplifier and reference symbols Ri and Rf are fixed resistances, respectively.

In FIG. 3, a set of "H bridge" comprising four MR elements $R_{11}$, $R_{12}$, and $R_{21}$ and $R_{22}$ forms a detector of one bit. An output of absolute positions of n bits can be obtained, if n sets of the "H bridge" are arranged at an interval of the minimum recording pitch $\lambda$ on the magnetic track.

A minimum of recording pitch of the magnetic track 3-3 for generating sinewave signals of two phases is set to $\lambda$ as like as that of the magnetic tracks 3-1 and 3-2. MR elements $R-$ and $R_{32}$ are arranged corresponding to the magnetic track 3-3, and separated from each other by $(n+\frac{1}{2})\lambda$ (where n=0, 1, 2, ---) (in FIG. 3, n32 1) on the recording track 3-3. MR elements $R_{41}$ and $R_{42}$ are arranged corresponding to the magnetic track 3-3 and separated from each other by $\lambda/2$ on the magnetic track 3-3 as shown in FIG. 3. The MR elements $R_{31}$ and $R_{41}$ are separated from each other by $n\lambda/3$ (n=1, 2, ---) (in FIG. 3, n=2) from each other.

Figure 6:
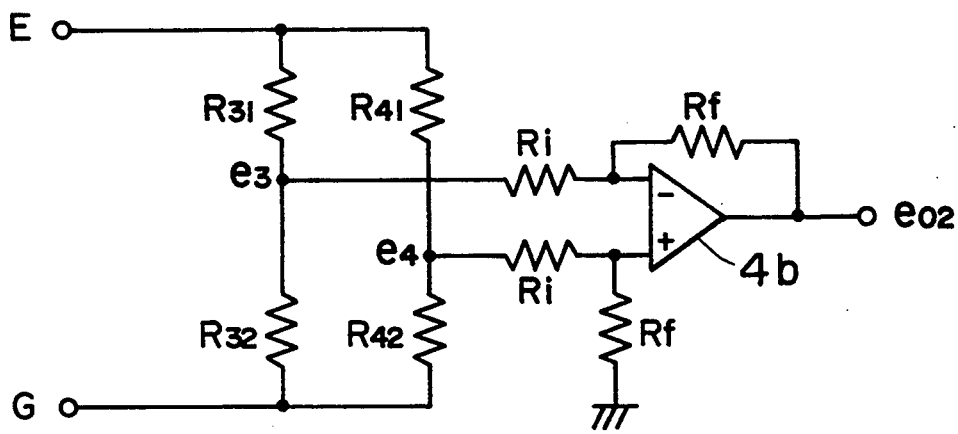
FIG. 6 shows a second processing circuit in the absolute encoder according to the present invention.

The MR elements $R_{31}$ and $R_{32}$ are connected to each other to form a circuit having a three-terminal generating an output $e_3$ and the MR elements $R_{41}$ and $R_{42}$ are connected to each other to form a circuit having a three-terminal generating an output $e_4$, as shown in FIGS. 3 and 6.

An output $e_{02}$ having sinewaves of two phases, or of $\sin \theta$ and $\cos \theta$ which are separated from each other in phase by $\pi/4$, as shown in FIG. 4 can be obtained from a second processing circuit shown in FIG. 6 using the outputs $e_3$ and $e_4$. In FIG. 6, reference numeral 4b denotes an operational amplifier. As stated above, the two circuits each having the three-terminal and forming "H bridge" are separated from each other by $n\lambda/3$, so that the output $e_{02}$ obtained by operating in the operational amplifier 4b shown in FIG. 6 becomes sinewaves having no the third harmonic and having less distortion.

Figure 7:
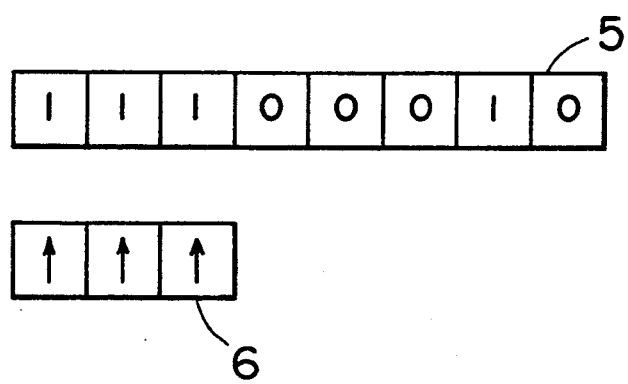
FIG. 7 is a view showing a pattern to be detected and a detector in the absolute encoder according to the present invention.

A manner to detect absolute positions of eight portions of a rotary member will be explained with reference to FIG. 7 showing a pattern 5 to be detected and a detector 6. The absolute positions of eight portions can be detected as codes of 0 to 7 by detecting signals of three bits from the pattern 5 to be detected by the detector 6.

Figure 8:
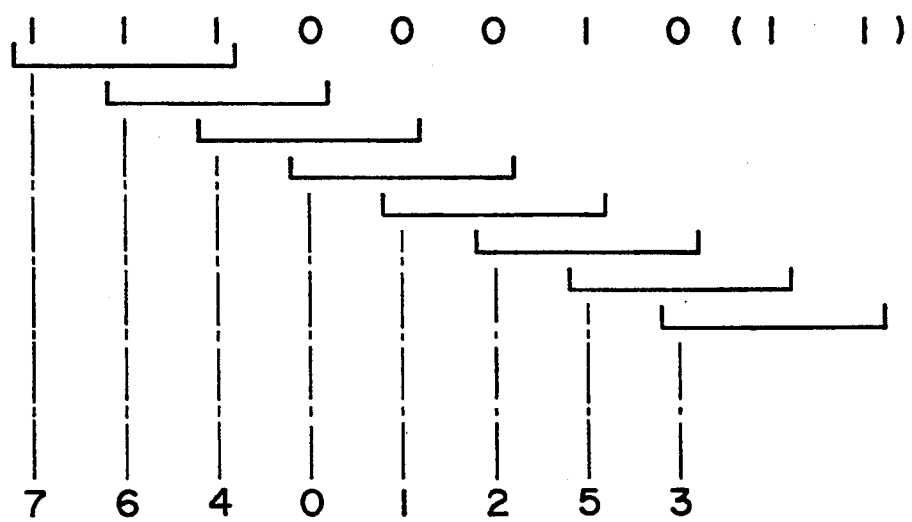
FIG. 8 is a view explaining a detected pattern in the absolute encoder according to the present invention.

Specifically, in FIG. 7, then the three bit signals are read by the detector 6 while shifting the detector 6 bit by bit in the rightward direction the bit signals can be coded to, as shown in FIG. 8, 7 6 4 0 1 2 5 3.

Accordingly, the eight positions of the rotary member can be detected as the codes of 0 to 7. If numerical values corresponding to the coded absolute positions of the 7, 6, 4, 0, 1, 2, 5, 3 are recorded preliminarily in memory elements, the codes can be read from 0 to 7, in order.

In the above descriptions, such a case that eight portions of the outer periphery of the rotary member are read by the detector of three bits is explained. However, if a detector of n bits is used absolute positions of portions of $2^n$ on the outer periphery of the rotary member can be read.

Figure 9:
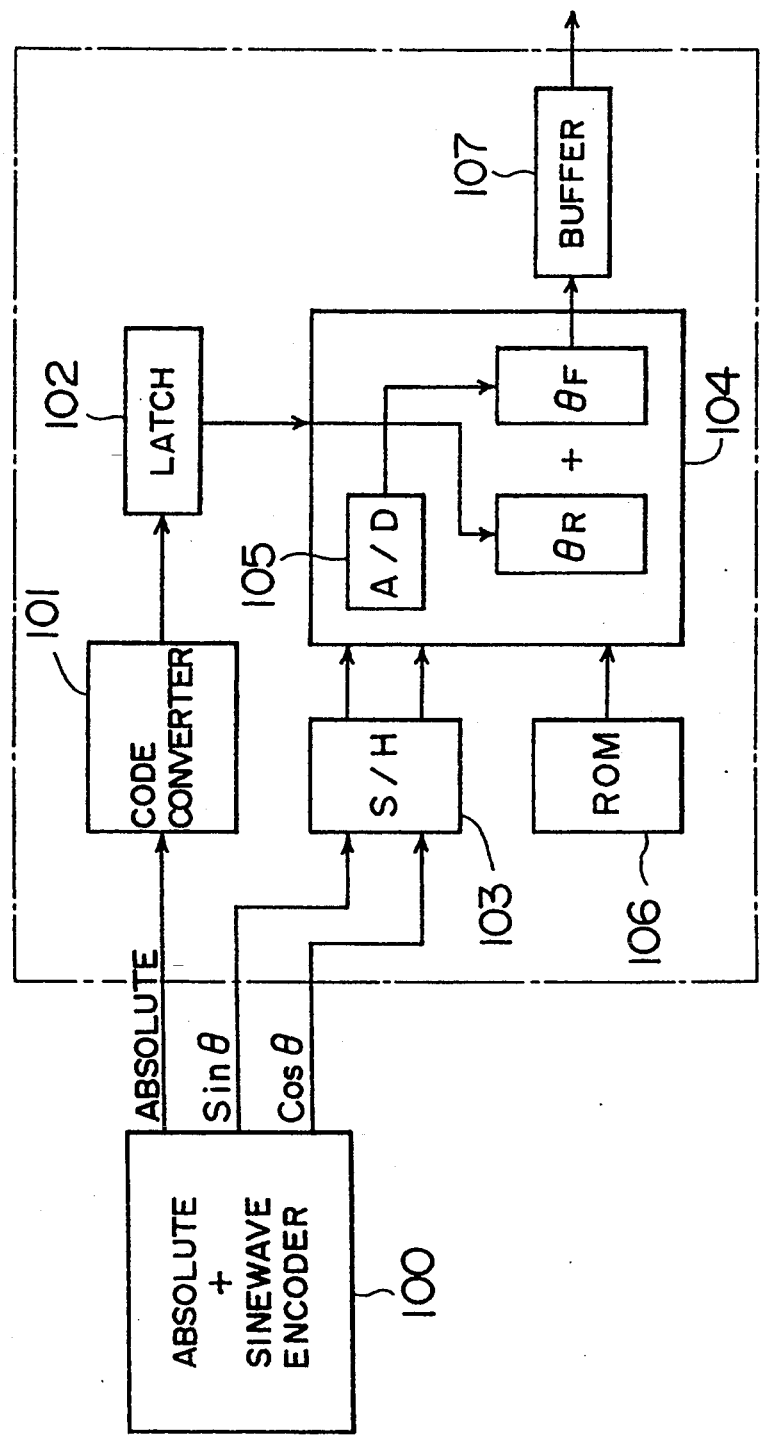
FIG. 9 is a block diagram of an operating and processing device in the absolute encoder according to the present invention.

In FIG. 9 showing an operating and processing device of the absolute encoder according to the present invention, reference numeral 100 denotes a detector in the absolute encoder, 101 denotes a code converter, 102 denotes a latch circuit, 103 denotes a wave form processing circuit such as a sampling and holding circuit, 104 denotes a CPU, 105 denotes an A/D converter, 106 denotes a ROM and 107 denotes a buffer.

In the operating and processing device shown in FIG. 9, an output indicating direct absolute positions obtained from the magnetic tracks 3-1 and 3-2 among the outputs of the detector 100 of the absolute encoder is applied as a coarse data to the CPU 104 through the code converter 101 and the latch circuit 102, as well as an output of sinewaves of two phases obtained from the magnetic track is processed in the wave form processing circuit 103 and applied to the CPU 104 through the A/D converter 105. The output of sinewaves is referenced in the CPU 104 to a data stored in the ROM 106 and converted into a fine data which is combined with the output indicating the direct absolute positions and outputted from the buffer 107.

Figure 10:
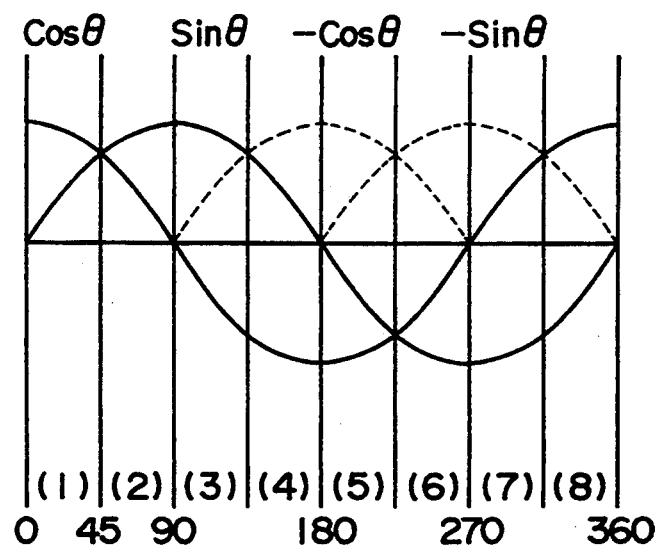
FIG. 10 is a view explaining sinewaves divided into eight regions in the absolute encoder according to the present invention.

Next, a manner to obtain the absolute positions in one cycle of the sinewave will be explained with reference to FIG. 10. As shown in FIG. 10, one cycle of the sinewave is divided into eight regions (1) to (8), so that if absolute values of $\sin\theta$ and $\cos\theta$ are considered the regions (1) and (2) are symmetric with each other centering about b 45°. Similarly, the regions (3) and (4), (5) and (6), and (7) and (8) are symmetric, respectively. Accordingly, if the position of the region within 0° to 360° can be determined the absolute positions can be obtained by calculating only the data within 0° to 45°. According to the manner, the processing time of the software can be reduced.

The absolute positions of the sinewave in one cycle obtained by the operation in the CPU 104 in the operating and processing device can be expressed by a formula $\theta = \arctan(\sin\theta/\cos\theta)$.

This formula indicates that no detection error is generated if the sinewaves of $\sin\theta$ and $\cos\theta$ are varied synchronously with each other.

Figure 11:
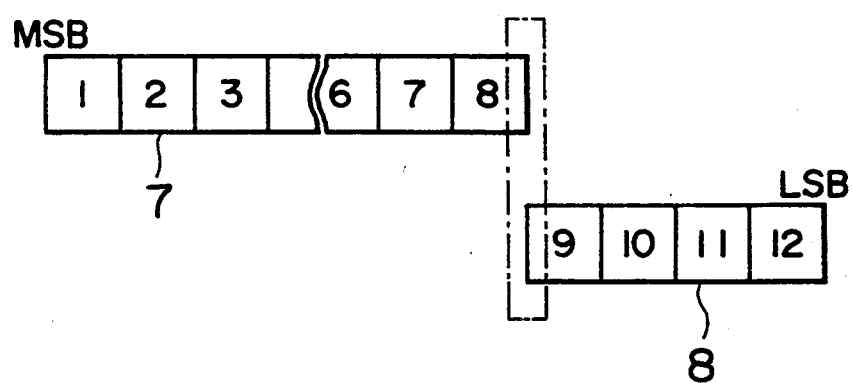
FIG. 11 is a view explaining the sum of a coarse signal and a dense signal in the absolute encoder according to the present invention.

As shown in FIG. 11, in the CPU 104, signals from a coarse signal portion 7 and a fine signal portion 8 are combined. Specifically, a coarse value of absolute positions obtained from the tracks having the absolute pattern is added as a high rank value to a fine value of absolute positions obtained from one cycle of the sinewave as a low rank value, so that an absolute encoder small in size and high in resolution can be realized.

In said embodiment, as shown in FIG. 3, magnetic patterns on the magnetic tracks 3-1 and 3-2 are detected by the MR elements $R_{11}$, $R_{12}$, $R_{21}$, and $R_{22}$. However, as shown in FIG. 2, the signal recording positions on the magnetic tracks 3-1 and 3-2 have a complementary relation with each other, that is, no signal recorded portions on one of the magnetic tracks 3-1 and 3-2 correspond to signal recorded portions on the other of the magnetic tracks 3-1 and 3-2. Accordingly, the output of the MR element generated at the borderline between the signal recorded portion and no signal recorded portion becomes instable. Especially, the output may have an error, when the coarse value of the absolute positions is obtained directly from the MR elements directly after the power switch is turned ON.

In another or second embodiment of the present invention, in order to prevent the generation of error directly after the ON of the power switch, MR elements $R_{11}$ and $R_{12}$, $R_{21}$ and $R_{22}$, $R_{31}$ and $R_{32}$, and $R_{41}$ and $R_{42}$, $---R_{(n+1)1}$ and $R_{(n+1)2}$ for detecting magnetic records on the magnetic tracks 3-1 and 3-2 are provided and connected to form circuits each having a three-terminal, and separated from the another by $\lambda/2$ to generate outputs $e_1$, $e_2$, $e_3$ - - - and $e_{2n+1}$, respectively, as shown in FIG. 12.

The outputs $e_1$ and $e_2$ are applied to input terminals of an operational amplifier 4c of a third processing circuit, and the outputs $e_2$ and $e_4$ are applied to input terminals of an operational amplifier 4d of a fourth processing circuit, as shown in FIG. 13. Similarly, the outputs $e_{2n-1}$, and $e_n$, and $e_{2n}$ and $e_{2n+1}$ are applied to input terminal of corresponding operational amplifiers, respectively.

Figure 14:
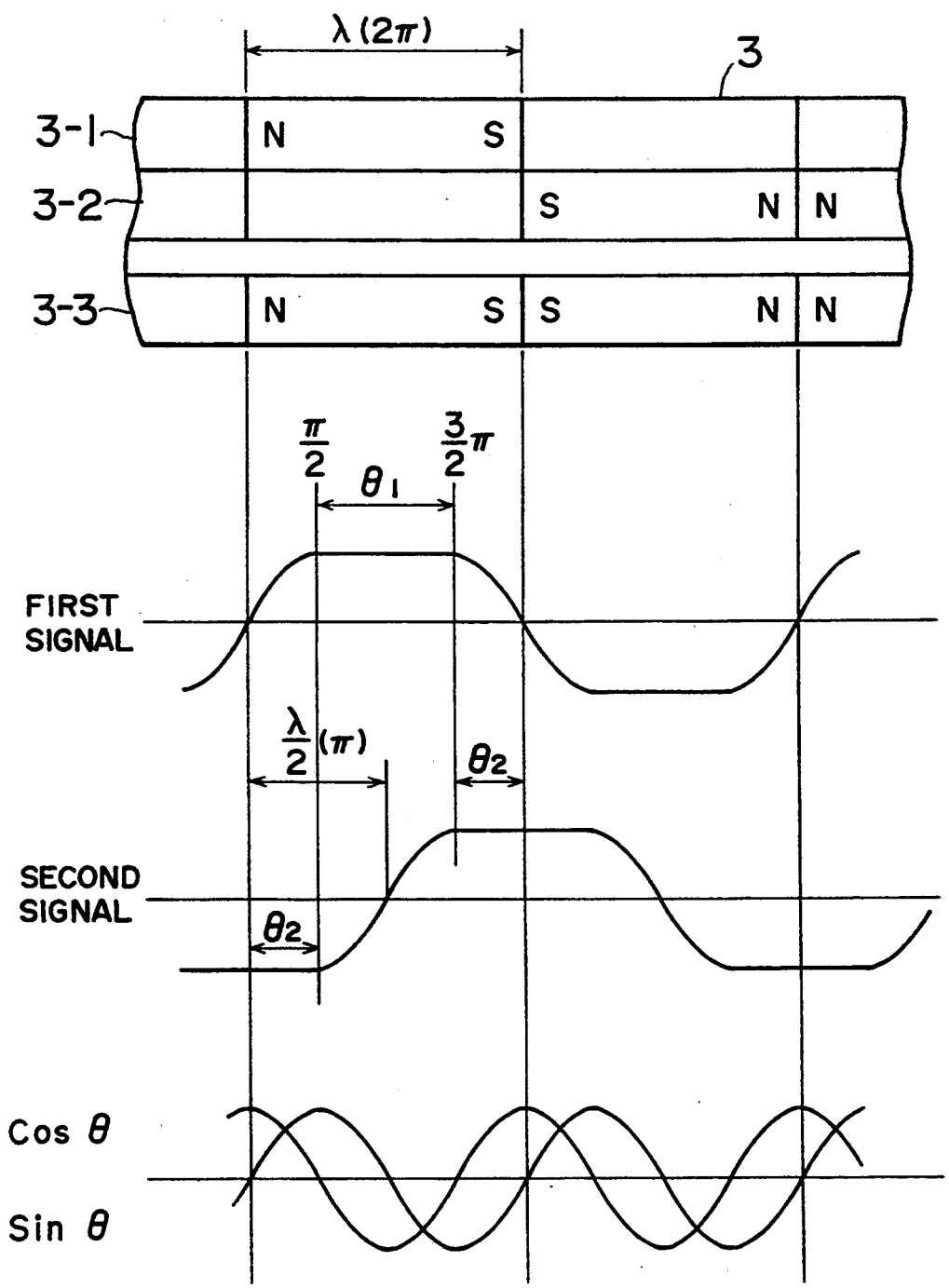
FIG. 14 is a view showing a magnetic track, a first signal, a second signal and sinewaves in said embodiment of the absolute encoder according to the present invention.

FIG. 14 shows magnetic tracks 3-1 and 3-2 having absolute patterns and a magnetic track 3-3 for forming outputs of sinewaves, as well as wave forms of first and second signals from an OR circuit 11a, and wave forms of $\cos\theta$ and $\sin\theta$, respectively.

The first signal is generated by processing the output $e_1$ of the circuit having the three-terminal formed by the MR elements $R_{11}$ and $R_{12}$ and the output $e_2$ of the circuit having the three-terminal formed by the MR element $R_{21}$ and $R_{22}$ by the operation amplifier 4c. The second signal is generated by processing the output $e_2$ of the circuit having the three-terminal formed by the MR elements $R_{21}$ and $R_{22}$ and the output $e_3$ of the circuit having the three-terminal formed by the MR elements $R_{31}$ and $R_{32}$ by the operation amplifier 4d.

The amplitude of the first signal is zero at a position on the N pole of the magnetic track, increases gradually and becomes to a maximum at a position of $\pi/2$ thereon. The amplitude is constant during a range of $\theta_1$, decreased from a position of $3\pi/2$ and becomes to zero at a position on the S pole of the magnetic track 3-1.

The amplitude of the second signal is a maximum at the position on the N pole of the magnetic track, constant during a range of $\theta_2$, decreases from the position of $\pi/2$, becomes to zero at a position $\pi$, increases to a maximum at the position of $3\pi/2$ and maintained to a position of $2\pi$.

As shown in FIG. 13, an output terminal of the operation amplifier 4c is connected to one of input terminals of an AND circuit 10a, as well as an output terminal of the operation amplifier 4d is connected to one of input terminals of an AND circuit 10b. An output of $\sin\theta$ in the output of sinewaves is applied to the other of input terminals of the AND circuit 10a, and an output of $\cos\theta$ is applied to the other of input terminals of the AND circuit 10b. Output terminals of the AND circuits 10a and 10b are applied two input terminals of an OR circuit 11a to obtain a signal of absolute positions from an output of the OR circuit 11a by using an output of the operational amplifier 4c during the range of $\theta_1$ and an output of the operational amplifier 4d during the range of $\theta_2$.

As stated above, the first signal is obtained during the range $\theta_1$ of form $\pi/2$ to $3\pi/2$, and the second signal is obtained during the range 02 of from 0 to $\pi/2$ with respect to the magnetic track 3-1, so that the signal of the absolute positions can be obtained at any positions on the magnetic track.

The output signal of the OR circuit 11a shown in FIG. 13 is applied to the CPU 104 shown in FIG. 9 to combine with the sinewave signal, similar to the first embodiment.

In this second embodiment, also, signals of absolute positions of n bits can be obtained by forming n sets of "H bridge" consisting of two sets of circuits each having a three-terminal, applying each output signal to each of the operational amplifiers in FIG. 13, and selecting one of the first and second signals through the AND circuit and OR circuit, respectively.

Figure 15:
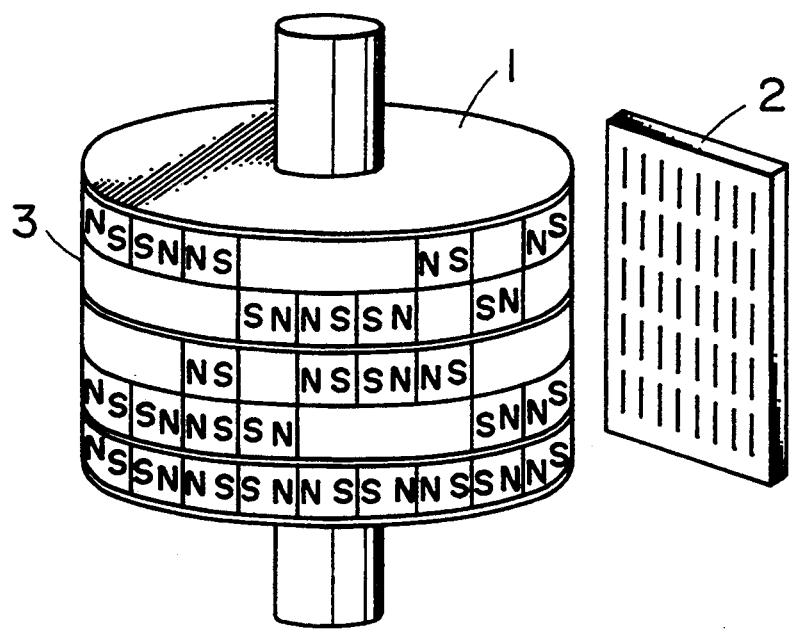
FIG. 15 is a perspective view showing an absolute encoder in a further embodiment according to the present invention.
Figure 16:
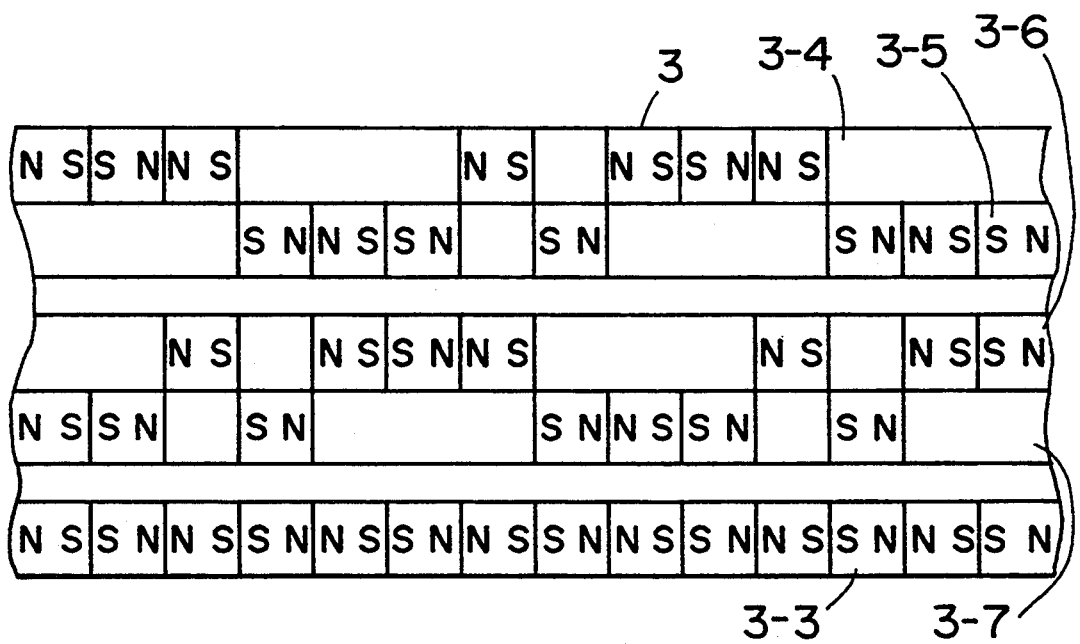
FIG. 16 is an extended view of an outer peripheral surface of a magnetic drum in the absolute encoder of said embodiment according to the present invention.

In a further or third embodiment according to the present invention, as shown in FIGS. 15 and 16, absolute patterns of 1½ of the information using circulatory random number sequence codes are recorded in two recording tracks 3-4 and 3-5 on the magnetic drum 1, separated from each other in the axial direction of the magnetic drum 1, as well as absolute patterns of remaining ½ of the information are recorded in two recording tracks 3-6 and 3-7. According to this embodiment, a high resolution can be obtained without being increased in size of the MR element and reduced in sensitivity of the MR element.

As shown in FIG. 16, the absolute patterns of ½ of the information are recorded on first and second magnetic tracks 3-4 and 3-5. The first magnetic track 3-4 has no signal recorded portions and signal recorded portions, whereas the second magnetic track 3-5 has signal recorded portions corresponding in position to said no signal recorded portions on the first magnetic track 3-4, and has no signal recorded portions corresponding in position to signal recorded portions on the first magnetic track 3-4.

The absolute patterns of remaining ½ of the information are recorded on the third and fourth magnetic tracks 3-6 and 3-7.

Figure 17:
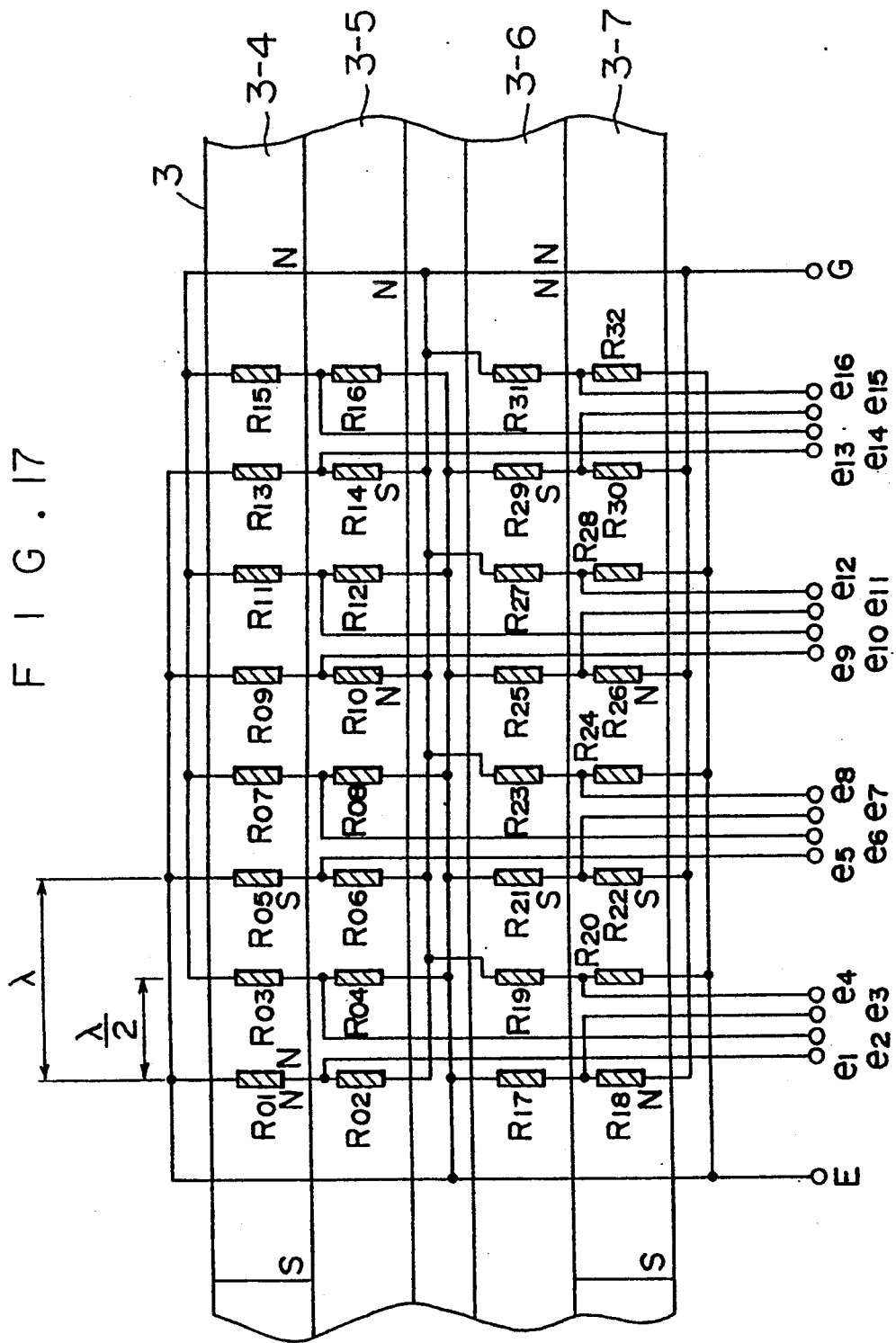
FIG. 17 is an extended view showing magnetic tracks and MR elements of a magnetic sensor in said embodiment according to the present invention.

As shown in FIG. 17, MR elements $R_{01}$, $R_{03}$, $R_{05}$ - - - $R_{15}$, and $R_{02}$, $R_{04}$, $R_{06}$ - - - $R_{16}$, and $R_{17}$, $R_{19}$, $R_{21}$ - - - $R_{31}$, and $R_{18}$, $R_{20}$, $R_{22}$ - - - $R_{32}$ are arranged facing the magnetic tracks 3-4, 3-5, 3-6 and 3-7, respectively. The MR elements $R_{01}$ and $R_{02}$, $R_{03}$ and $R_{04}$, $R_{05}$ and $R_{06}$, - - - and $R_{31}$ and $R_{32}$ are each form a circuit having a three-terminal.

Neighboring MR elements in the MR elements $R_{01}$ to $R_{32}$ are separated from each other by $\lambda/2$. The MR elements $R_{17}$ and $R_{18}$ on the third and fourth magnetic tracks 3-6 and 3-7 are continued with the MR elements $R_{15}$ and $R_{16}$ on the first and second magnetic track 3-4 and 3-5, respectively. The absolute patterns recorded on the third and fourth magnetic tracks 3-6 and 3-7 are the same with that on the first and second magnetic tracks 3-4 and 3-5 and deviated from each other by four bits. The outputs obtained from the circuits each having the three-terminals when the rotary member is rotated are applied to a processing circuit of a differential amplifier to obtain absolute outputs.

As shown in FIG. 18, according to the present invention, the magnetic tracks are divided and arranged side-by-side on the magnetic drum, so that the distance L between the MR elements at the center portion and the end portion of the magnetic sensor 2 corresponding to the magnetic tracks becomes small, so that $d \approx a$ and leakage magnetic flux can be sensed fully to obtain a stable output.

Figure 19:
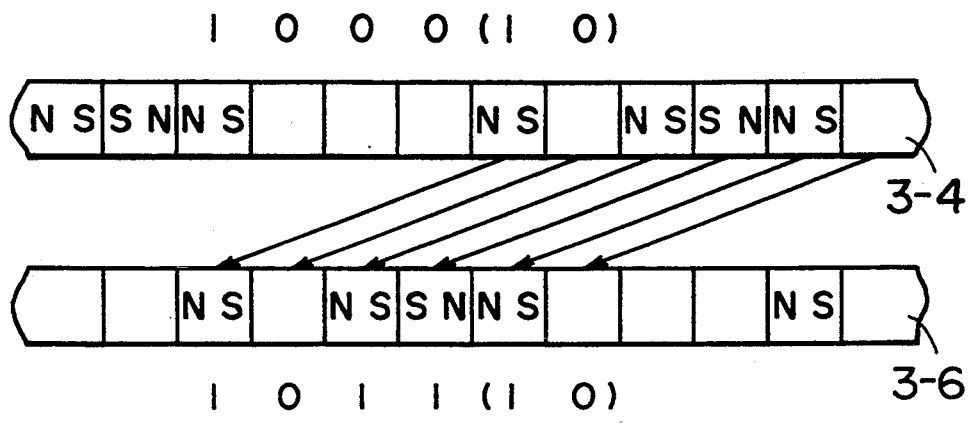
FIG. 19 is a view showing a pattern to be detected and bits in said embodiment according to the present invention.

A method of detecting the absolute positions will be explained with reference to FIGS. 19 and 20. FIG. 19 shows a relation in position between the first and third magnetic tracks 3-4 and 3-6 and the absolute patterns, and bit informations "1" and "0" corresponding to each magnetic track. In this case, four bit informations are obtained from the first track 3-4, as well as four bit informations are obtained from the third magnetic track 3-6. If the three bit informations are detected at a time, positions at eight portions can be detected using 0 to 7.

Figure 20:
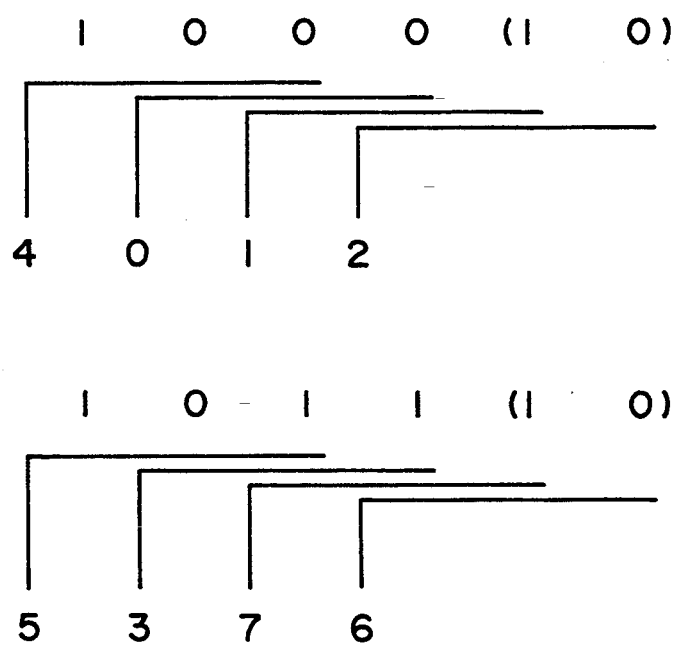
FIG. 20 is a view showing detected patterns in said embodiment according to the present invention.

Specifically, as shown in FIG. 20, the positions can be detected as if the three bit informations are detected at a time by shifting bit by bit the detecting portion of the 1 to n/2 bits in the rightward direction.

Figure 21:
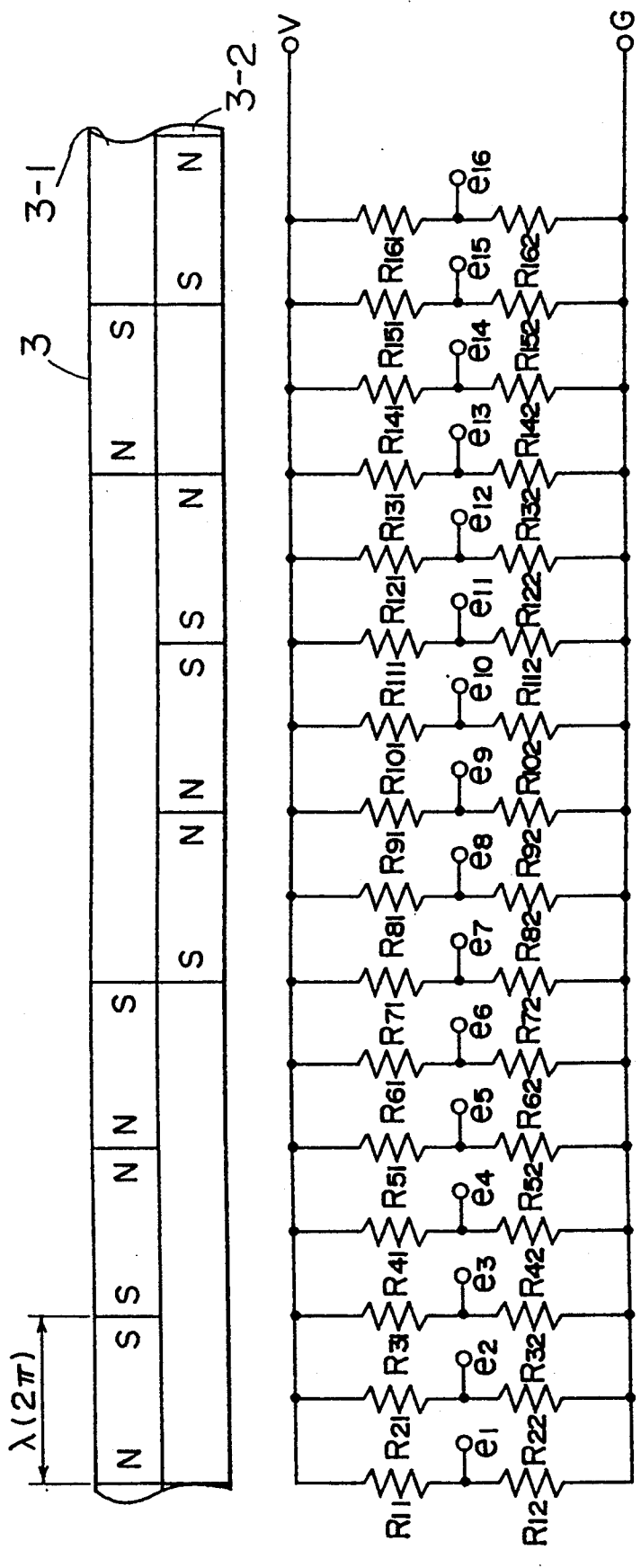
FIG. 21 is an extended view showing magnetic tracks and MR elements of a magnetic sensor in a yet further embodiment of an absolute encoder according to the present invention.

In a yet further or fourth embodiment shown in FIG. 21, MR elements $R_{11}$, $R_{21}$, $R_{31}$, - - - $R_{161}$ are arranged corresponding to the magnetic track 3-1, and MR elements $R_{12}$, $R_{22}$ $R_{32}$, - - - $R_{162}$ are arranged corresponding to the magnetic track 3-2. The MR elements $R_{11}$ and $R_{12}$, $R_{21}$, and $R_{22}$, $R_{31}$ and $R_{32}$, - - -$R_{161}$ $R_{162}$ are connected to each other to form circuits each having a three-terminal, and first terminals of the circuits at the side of the magnetic track 3-1 are connected commonly to (V) line of the power source, second terminals of the circuits at the side of the magnetic track 3-2 are connected commonly to (G) line of the same to obtain outputs $e_1$ to $e_{16}$ from output terminals of the circuits.

According to this embodiment, the magnetic sensor portion and the power source portion are formed in a first layer, and wirings of the output terminals of the circuits are formed in a second layer, so that no through holes between the magnetic sensor portion and the power source is required to thereby enhancing the reliability of the absolute encoder.

Figure 22:
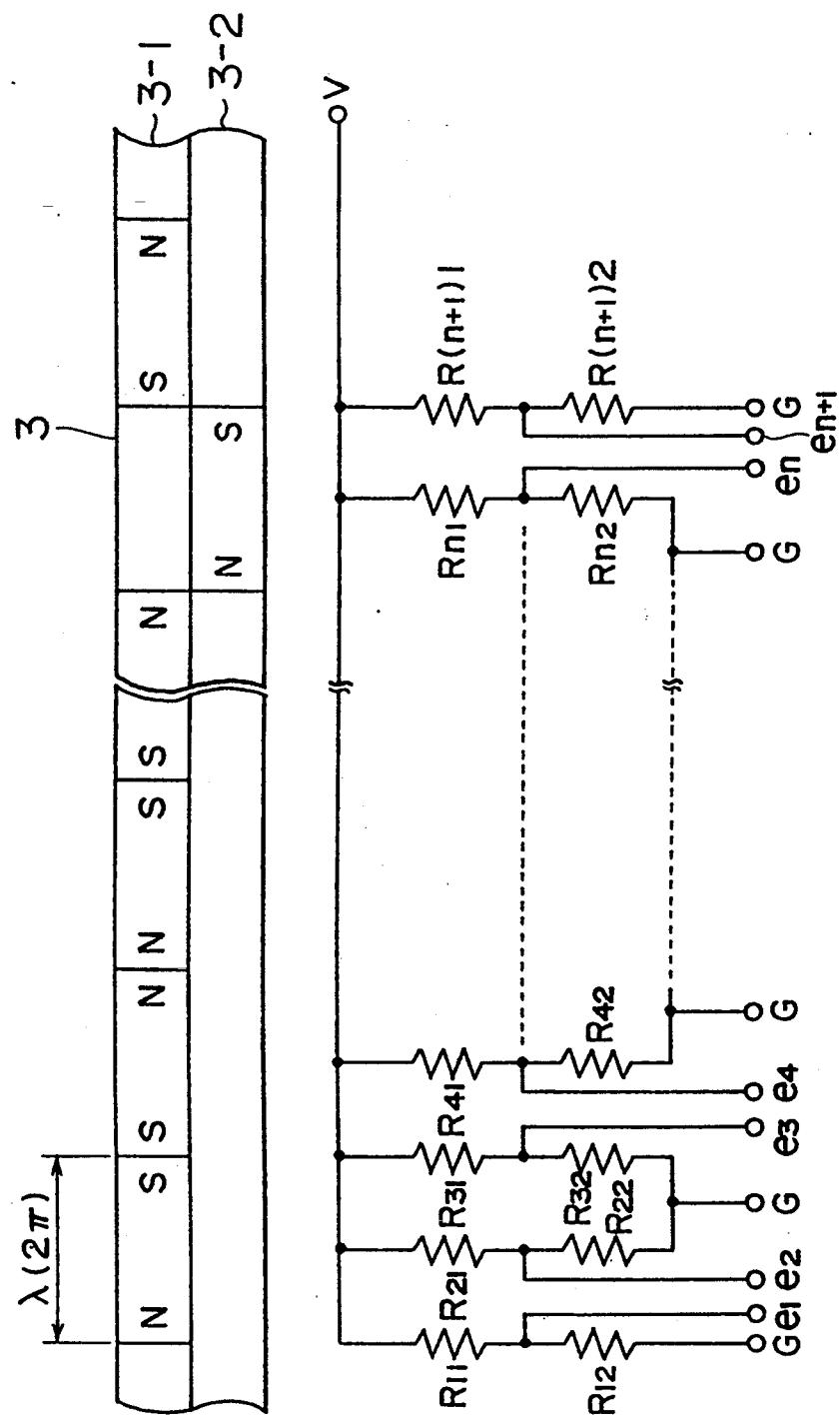
FIG. 22 is an extended view showing magnetic tracks and MR elements of a magnetic sensor in the other embodiment of an absolute encoder according to the present invention.
Figure 23:
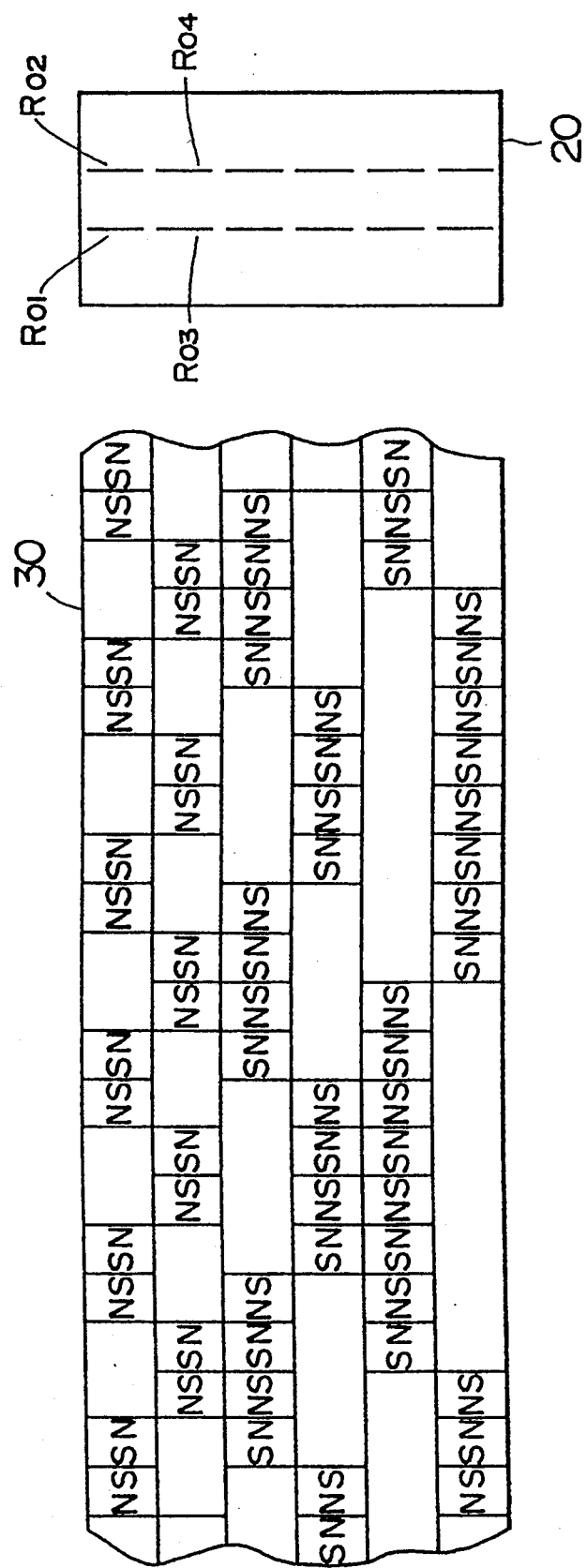
FIG. 23 is an extended view showing magnetic tracks and MR elements of a magnetic sensor in the conventional absolute encoder.
Figure 24:
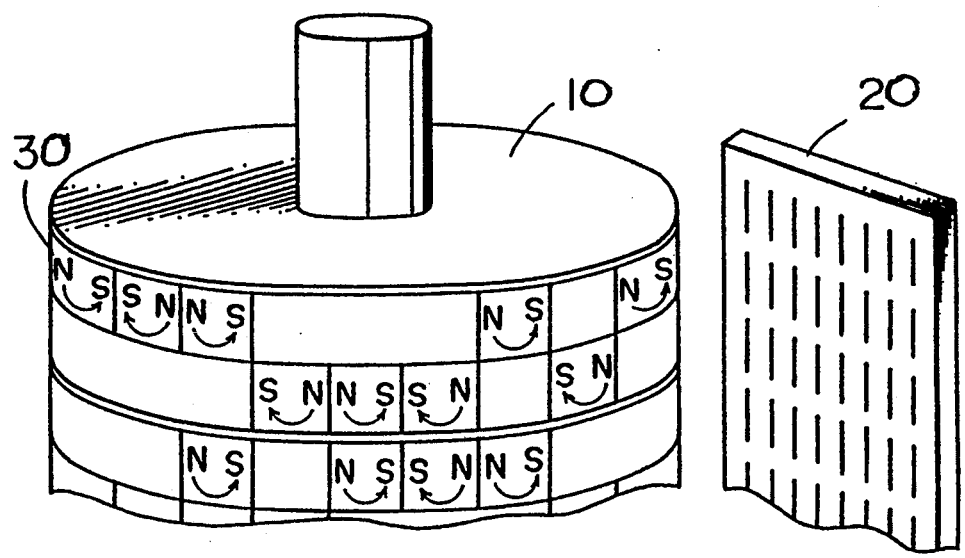
FIG. 24 is a view explaining leakage magnetic fluxes of the magnetic drum in the conventional absolute encoder.
Figure 25:
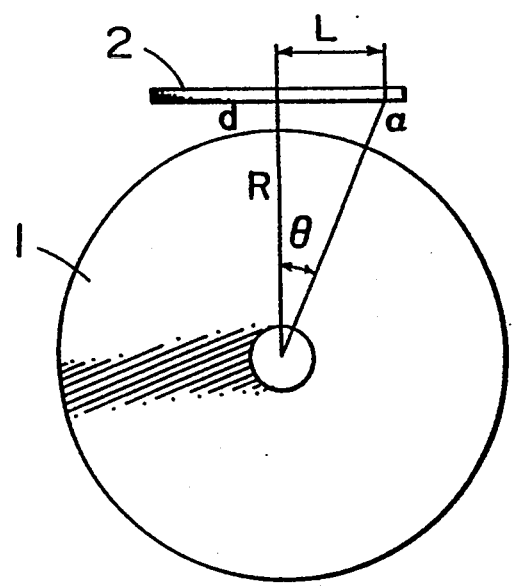
FIG. 25 is a view explaining the relation between the magnetic drum and the magnetic sensor in the conventional absolute encoder.

In a still further or fifth embodiment according to the present invention shown in FIG. 22, MR elements $R_{11}$, $R_{21}$, $R_{31}$, - - - $R_{(n+1)1}$ are arranged corresponding to the magnetic track 3-1, and MR elements $R_{12}$, $R_{22}$, $R_{32}$, - - - $R_{(n+1)2}$ are arranged corresponding to the magnetic track 3-2. The MR elements $R_{11}$ and $R_{12}$, $R_{21}$ and $R_{22}$, $R_{31}$ and $R_{33}$, - - - $R_{(n+1)1}$ and $R_{(n+1)2}$ are connected to each other to form circuits each having a three-terminal, and terminals of the circuits at the side of the magnetic track 3-1 are connected commonly to (V) line of the power source. If all of terminals of the circuits at the side of the magnetic track 3-2 are connected to (G) line of the power source, output lines of the circuits must lead across the (G) line. Accordingly, adjacent terminals of neighboring "H bridge" at the side of the magnetic track 3-2 are connected directly to each other and a common (G) line is lead therefrom. In this embodiment, the MR elements can be formed in one layer so that the reliability of the absolute encoder can be increased, though the terminals are increased in number.

It will be appreciated that the present invention can be applied to a linear encoder, other than the rotary type magnetic encoder explained already.

EFFECT OF THE INVENTION

With the construction thus far described, according to the present invention, an encoder small in size and high in resolution can be realized.

It is possible to obtain finely the value of absolute positions in one cycle of sinewave, so that sinewave having less distortion can be obtained to form an absolute encoder of increased resolution.

Further, the MR elements can be disposed without being cross the power line, and the MR elements can be formed in one layer, because the terminals of the circuits adjacent to each other to be connected to the (G) line are connected to the (G) line through a common line to form an absolute encoder having a high reliability.

Obviously, many modifications and variations of the present invention are possible in light of the above teachings. It therefore to be understood that within the scope of the appended claims, the present invention may be practiced otherwise than as specifically described herein.

What is claimed is:

1. An absolute encoder comprising:
a magnetic drum having first, second, and third tracks and having patterns thereon;
a pattern detector for reading said patterns on the first, second, and third tracks;
said first and second tracks being arranged side-by-side on said magnetic drum in the axial direction thereof, and having divided and recorded thereon absolute patterns of circulatory random sequence codes which, when read, yield a first value of an absolute position;
said third track providing a pair of sine waves in synchronism with the reading of the absolute patterns on the first and second tracks, said third track, when read, yielding a second value of an absolute position, and said first and second values of an absolute position being combined to obtain an output.

2. The absolute encoder as set forth in claim 1, said pattern detector obtaining from said first and second tracks a first signal and a second signal deviated in phase from each other by one half of pole pitch of magnetic recording;
one of said first and second signals being selected according to said second value of an absolute position; and
said second value of an absolute position is interpolated to the selected signal to obtain said output.

3. An absolute encoder comprising:
a magnetic drum having first, second, and third tracks and having patterns thereon;
a pattern detector for reading patterns on the first, second, and third tracks;
said first and second tracks being arranged side-by-side on respective first and second track sides of the magnetic drum in the axial direction thereof, said first and second tracks having divided and recorded thereon absolute patterns of circulatory random sequence codes;
said third track providing a pair of sine waves in synchronism with the reading of the absolute patterns on the first and second tracks;
said pattern detector having a plurality of sets of magneto-resistive elements which are deviated in position from each other by one half of the recording pitch of the first, second, and third tracks;
each of said plurality of sets having two magneto-resistive elements facing said first and second tracks respectively and being connected with each other to form a plurality of circuits each having two magneto-resistive elements;
each of said plurality of circuits having a first track side and a second track side corresponding to said first and second track sides of said magnetic drum;
each of said plurality of circuits having a terminal at the first track side connected to one terminal of an electric power source, a terminal at the second track side connected to another terminal of the electric power source, and an intermediate terminal between the two magneto-resistive elements of the circuit, from which an output is obtained.

4. An absolute encoder comprising:
a magnetic drum having first, second, and third tracks and having patterns thereon;
a pattern detector for reading patterns on the first, second, and third tracks;
said first and second tracks being arranged side-by-side on respective first and second track sides of the magnetic drum in the axial direction thereof, said first and second tracks having divided and recorded thereon absolute patterns of circulatory random sequence codes;
said third track providing a pair of sine waves in synchronism with the reading of the absolute patterns on the first and second tracks;
said pattern detector having a plurality of sets of magneto-resistive elements which are deviated in position from each other by one half of the recording pitch of the first, second, and third tracks;
each of said plurality of sets having two magneto-resistive elements facing said first and second tracks respectively and being connected with each other to form a plurality of circuits each having two magneto-resistive elements;
each of said plurality of circuits having a first track side and a second track side corresponding to said first and second track sides of said magnetic drum;
terminals at the first track side of odd number circuits and terminals at the second track side of even number circuits, said terminals being connected to a first terminal of an electric power source;
terminals at the second track side of odd number circuits and terminals at the first track side of even number circuits, said terminals being connected to a second terminal of said electric power source; and
an intermediate terminal between the two magneto-resistive elements in each of said plurality of circuits, from which an output is obtained.

5. An absolute encoder comprising:
a magnetic drum having first, second, and third tracks and having patterns thereon;
a pattern detector for reading patterns on the first, second, and third tracks;
said first and second tracks being arranged side-by-side on respective first and second track sides of the magnetic drum in the axial direction thereof, said first and second tracks having divided and recorded thereon absolute patterns of circulatory random sequence codes;
said third track providing a pair of sine waves in synchronism with the reading of the absolute patterns on the first and second tracks;
said pattern detector having a first to (n+1)th sets of magneto-resistive elements which are deviated in position from each other by one half of the recording pitch of the first, second, and third tracks, where n is a whole number greater than three;
each of said plurality of sets having two magneto-resistive elements facing said first and second tracks respectively and connected with each other to form a plurality of circuits each having two magneto-resistive elements;
each of said plurality of circuits having a first track side and a second track side corresponding to said first and second track sides of said magnetic drum;
terminals at the first track side of each of said plurality of circuits connected to a first terminal of an electric power source;
terminals at the second track side of the first and (n+1)th circuits connected to a second terminal of said electric power source, each terminal at the second track side of the second to nth circuits being directly connected to only the neighboring terminal at the second track side of a neighboring circuit and then connected to said second terminal of the electric power source through a common line; and an intermediate terminal between the two magneto-resistive elements in each of said circuits, from which an output is obtained.

* * * * *